United States Patent

[11] 3,567,178

| [72] | Inventor | Norman A. Nelson<br>Houston, Tex. |
|---|---|---|
| [21] | Appl. No. | 861,745 |
| [22] | Filed | Sept. 29, 1969 |
| [45] | Patented | Mar. 2, 1971 |
| [73] | Assignee | ACF Industries, Incorporated<br>New York, N.Y. |

[54] VALVE STEM PACKING AND BEARING ASSEMBLY
9 Claims, 7 Drawing Figs.

[52] U.S. Cl. ............................................. 251/214,
251/315, 277/170
[51] Int. Cl. .................................................F16k 41/16,
F16j 15/10
[50] Field of Search........................................... 251/214,
304, 309, 315; 277/112, 170, 171

[56] References Cited
UNITED STATES PATENTS

| 3,096,786 | 7/1963 | Rost | 251/315X |
| 3,231,235 | 1/1966 | Anderson et al. | 251/315X |
| 3,443,816 | 5/1969 | Saleri et al. | 277/112 |
| 3,445,087 | 5/1969 | Priese et al. | 251/315X |

Primary Examiner—William F. O'Dea
Assistant Examiner—David R. Matthews
Attorney—James L. Jackson ABSTRACT: A valve stem packing and bearing assembly for plug valves having a rotatable valve stem for inducing actuation of an internal valve element between the open and closed positions thereof. The body of the valve is provided with a stem passage having an internal restriction defined by an annular internal flange. A rotatable valve stem having a shoulder defined at the lower portion thereof extends through the stem passage. A pair of annular sealing members are disposed within the stem passage, one on either side of the annular internal flange and serve to establish seals between the valve stem and the stem passage portion of the valve body and to serve as thrust bearings. The sealing members are deformed upon assembly from originally flat cross-sectional configuration to a tapered configuration that causes pressure acting from within the valve to urge both of the seals in a direction tending to increase the sealing ability thereof.

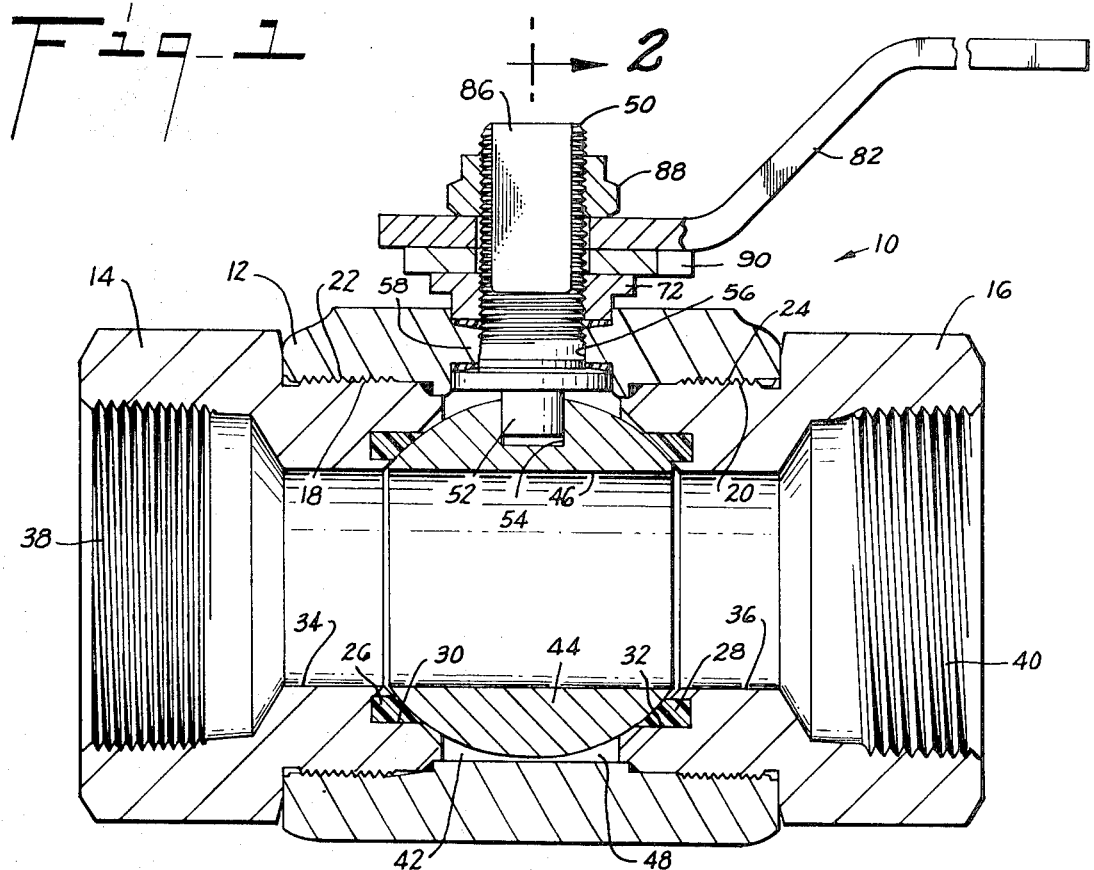
Fig-1
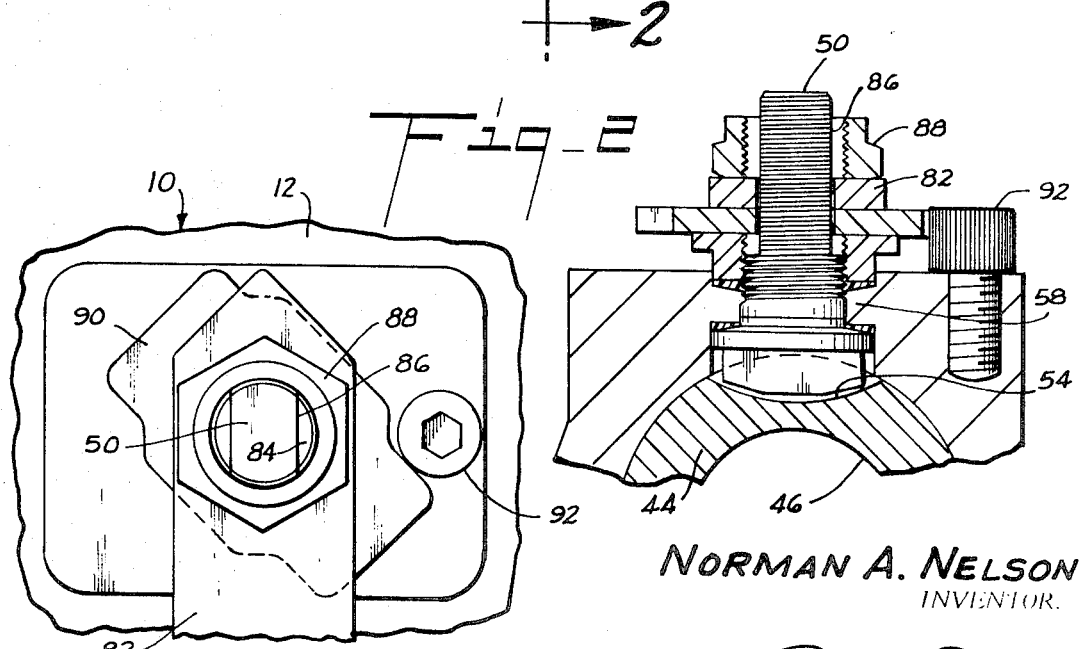
Fig-2
Fig-3
NORMAN A. NELSON
INVENTOR.
BY James D Jackson
ATTORNEY PATENTED MAR 2 1971  3,567,178
SHEET 2 OF 2
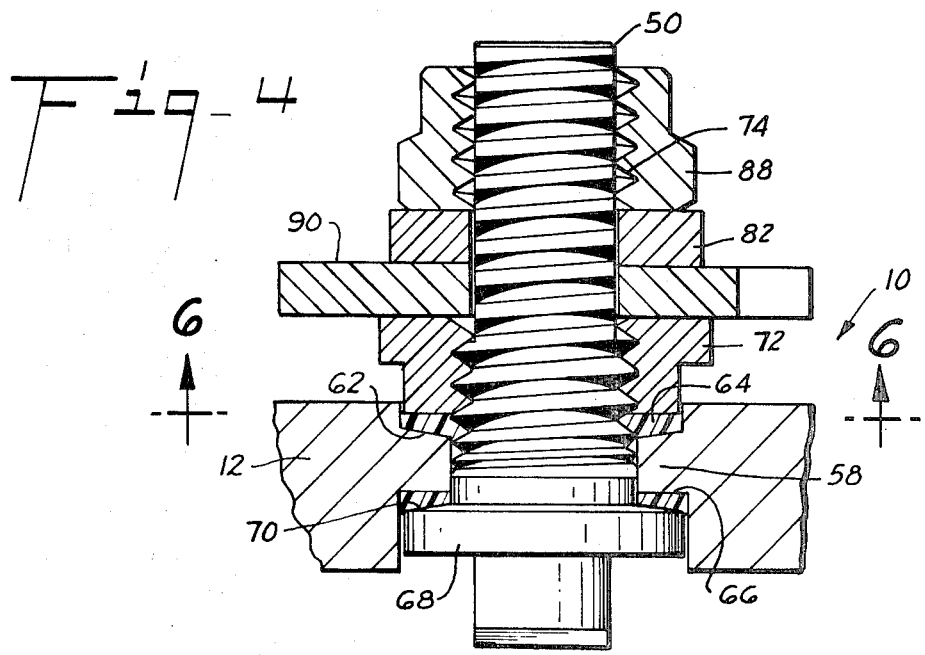
Fig. 4
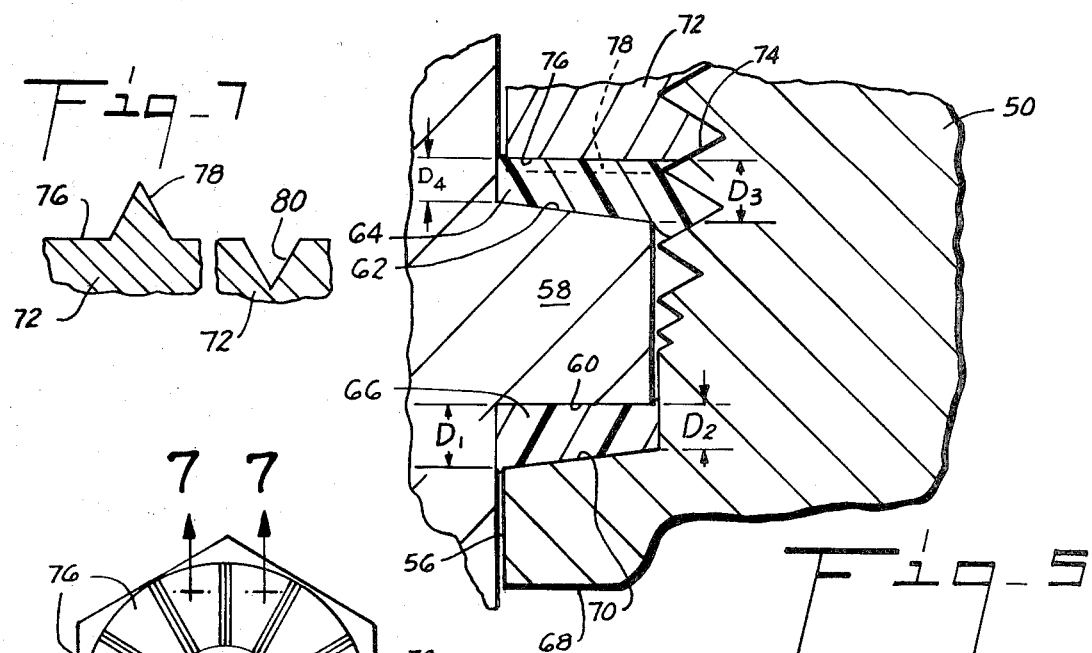
Fig. 7
Fig. 5
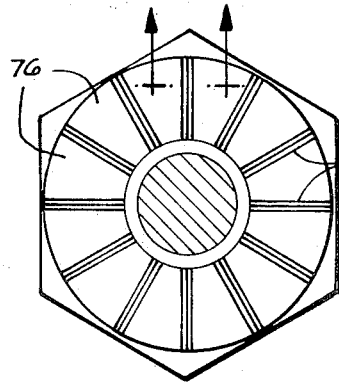
Fig. 6
NORMAN A. NELSON
INVENTOR.
BY *James D. Jackson*
ATTORNEY

VALVE STEM PACKING AND BEARING ASSEMBLY

BACKGROUND OF THE INVENTION

Many spherical plug valves, cylindrical plug valves, tapered plug valves and other similar valve structures are provided with stem packing members composed of various plastic sealing materials such as polytetrafluoroethylene, for example, to establish fluid-tight seal between the valve body and a rotatable valve stem. A common method of achieving a seal between a valve stem and the valve stem passage through which the valve stem extends is to place packing material around the valve stem and compress the packing material until it expands sufficiently to effect a fluid fluid-tight seal with the wall of the stem passage. A valve stem seal of this nature is a direct compression type seal tending to bind the stem and frequently increases the torque necessary to turn the valve stem to an objectionably high level. Moreover, the increased packing wear that is developed by direct compression seals generally renders this method of sealing unsatisfactory.

Valves having rotatable valve stems are frequently designed so tat an internal restriction is provided within the valve stem passage thereof either by the valve body structure or by the valve stem structure. Combination packing and thrust bearing assemblies are disposed on either side of the internal restriction and are placed under direct compression in order to effect a fluid-tight seal. The direct compression causes the plastic material do to deform under compression thereby increasing its sealing ability. The mechanical pressure necessary to develop a fluid-tight seal of this nature generally tends to increase the torque necessary to impart opening and closing movement to the valve element and increases the tendency of the sealing elements to wear. Moreover, fluid pressure within the valve tends to decrease or adversely affect the sealing ability of such stem packing and bearing assemblies.

SUMMARY OF THE INVENTION

It is a principle object of the present invention to provide a novel valve stem packing and bearing assembly utilizing plastic materials such as polytetrafluoroethylene to achieve the development of a positive seal between the rotatable valve stem and the stem passage through which the valve stem extends without increasing the torque required to rotate the valve element to an undesirable level.

It is a further object of the invention to provide a novel valve stem packing and bearing assembly that effectively utilizes the internal pressure of the valve to increase the sealing ability of the stem packing and bearing assembly.

Among the several objects of my invention is contemplated the provision of a novel valve stem packing and bearing assembly requiring minimal mechanical pressure to achieve the development of a positive seal between the rotatable valve stem and the stem passage through which the valve stem extends.

It is an even further object of this invention to provide a novel valve stem packing and bearing assembly that is subject to minimal wear during operation thereof.

Another object of my invention involves the provision of a novel valve stem packing and bearing assembly that is simple in nature, reliable in use and low in cost.

The above and other objects and novel features of the instant invention will be readily apparent from the following description taken in conjunction with the accompanying drawings. It is to be expressly understood that the drawings are provided for the purpose of illustration and are not intended to define the limits of the invention, but rather to merely illustrate a preferred embodiment and structure incorporating the features of the instant invention. Such description will be referred to by reference characters in the drawings in which:

FIg. 1 is an elevational view in section illustrating a spherical plug valve structure constructed in accordance with the present invention.

FIG. 2 is a sectional view taken along line 2–2 in FIG. 1 and illustrating the valve stem packing and bearing assembly in detail.

FIG. 3 is a fragmentary plan view of the valve structure of FIG. 1 illustrating the stem stop structure of the valve in detail.

FIG. 4 is a fragmentary sectional view of the valve structure of FIG. 1 enlarged sufficiently to show the valve packing and thrust bearing assembly in detail.

FIG. 5 is a fragmentary sectional view illustrating the valve stem packing and bearing assembly structure of FIG. 4 in enlarged detail.

FIG. 6 is a sectional view taken along line 6–6 in FIG. 4 and illustrating the lower surface configuration of the packing retainer.

FIG. 7 is a fragmentary sectional view of the packing retainer structure of FIG. 6 and illustrating the surface configuration thereof in detail and illustrating a modified surface configuration.

Referring now to the drawings for a better understanding of the invention, a spherical plug valve illustrated generally at 10 consists of a generally tubular body portion 12 to which end closure members 14 and 16 are threadedly attached. As illustrated in FIG. 1, the valve body section 12 is provided with internal threads 18 and 20 which receive external threads 22 and 24 formed on the end closure members. Obviously, the end members may be connected to the valve body portion by means of bolt and flange assemblies as is common in the valve industry without departing from the spirit or scope of this invention. Annular sealing members 26 and 28 are retained within appropriate grooves 30 and 32 formed in the end closure members 14 and 16, respectively, in substantially concentric relation with flow passages 34 and 36 formed in the end closure members. The end closure members are provided with internal threaded portions 38 and 40 for threaded attachment to conduit structure in well known manner. Obviously, the end closure members 14 and 16 may be connected to the conduit structure of a piping system by welding or by flange structure or by any other well known method of connection without departing from the spirit and scope of this invention.

The end closure members 14 and 16 cooperate with the valve body portion 12 to define a centrally located valve chamber 42 in which a valve element 44 is disposed for rotation therein. The valve element 44 is illustrated as a spherical plug element, but it should be borne in mind that the instant invention is not limited to this particular construction. The rotatable valve element or spherical plug 44 is provided with a flow passage 46 that registers with the flow passages 34 and 36 in the open position of the valve as shown in FIG. 1. The spherical plug is provided with a spherical working surface 48 that is disposed in sealing engagement with the annular seat members 26 and 28 in all positions of the ball. The spherical plug 44 is rotated, from the open position, illustrated in FIG. 1, to the closed position thereof where the spherical working surface 48 blocks the flow of fluid through the flow passages 34 and 36, by a rotatable valve stem member 50. An elongated drive portion 52, disposed at the lower extremity of the valve stem 50, is received within a corresponding shaped drive recess or groove 54, formed in the upper portion of the plug member 44, in order to provide a nonrotatable connection between the valve stem and the plug member.

The valve stem 50 extends through a stem passage 56 that is formed through the valve body 12. The stem passage 56 is restricted intermediate its extremities by an annular internal flange 58 defining a substantially planar lower surface 60 and an upper surface 62 of substantially frustoconical configuration, as best illustrated in FIG. 5. Upper and lower annular sealing elements 64 and 66, respectively, are disposed within the stem passage 56 on either side of the annular flange 58 and serve as combination packing members and thrust bearings. The sealing members 64 and 66 may be composed of any one of a number of acceptable packing materials, but for purposes of this invention the sealing members are illustrated as being composed of a plastic material such as polytetrafluoroethylene.

In order to maintain the packing and thrust bearing members 64 and 66 under minimum compression, the valve stem 50 is provided with an annular flange 68 at the lower portion thereof. The flange 68 is provided with a frustoconical surface 70 that is disposed in sealing engagement with the lower surface of the lower sealing element 66. A packing retainer member 72 is threadedly received by external threads 74 formed on the valve stem 50 and is provided with a lower substantially planar surface 76 having a low coefficient of friction. The low coefficient of friction may be established by a plurality of radial grooves or ridges 78 or 80, respectively, as illustrated in FIGS. 6 and 7 or a combination of ridges and grooves if desired. Obviously, the surface 76 may be knurled or may be provided with any other acceptable surface deformity in order to decrease the coefficient of friction thereof. Upon assembly of the sealing elements 64 and 66 within the valve stem passage 56, the sealing elements are deformed from a substantially flat or washerlike configuration to the tapered configuration illustrated in FIG. 5 by threading the retainer 72 downwardly on the stem 50 causing the retainer to be forced into the upper sealing element 64 while the surface 70 of the flange 68 is drawn into deforming engagement with the lower sealing element 66.

The valve stem 50 is provided with sufficient threaded length that threads are disposed adjacent the upper sealing element 64 when the parts are properly assembled. The inner peripheral portion of the upper sealing element 64 upon being deformed will cold flow into the threaded portion of the valve stem thereby establishing positive mechanical interconnection between the upper sealing element and the threads. As the sealing element 64 is deformed upon assembly, material from which the sealing element is composed will also cold flow into the surface irregularities defined in the surface 76 of the retainer member 72. The mechanical interconnection between the sealing element 64, the valve stem threads 74 and the surface irregularities of the surface 76 will cause the sealing element 64 to be rotated along with the valve stem and retainer rather than remaining static as the valve stem and retainer are rotated to open or close the valve. Any leakage path, therefore, must be defined along the frustoconical surface 62 of the flange 58 and upwardly along the wall of the stem passage 56. A torturous path, therefore, is defined that tends to prevent the development of leakage.

As indicated above, the sealing elements 64 and 66 are deformed upon assembly from an initial substantially flat cross-sectional configuration to the tapered configuration illustrated particularly in FIG. 5. The lower sealing element 66, upon being deformed presents a substantially larger exterior peripheral dimension D1 than the inner peripheral dimension D2 thereof. This feature causes fluid pressure to act upon the greater surface area of the exterior peripheral dimension D1 thereby tending to force the sealing element 66 radially in the direction of the smaller interior peripheral dimension D2. This feature is generally referred to as pressure actuation and tends to urge the sealing element against the confining surfaces away from the source of pressure thereby increasing the sealing ability of the surfaces. The resulting deformed configuration of the lower sealing element 66, therefore, cooperates with pressure within the valve to enhance the sealing ability thereof in direct relation to the pressure within the valve.

The upper sealing element 64 is provided with a greater interior peripheral dimension D3 thereof that is substantially greater than the external peripheral dimension D4 thereof, causing the upper sealing element to be pressure actuated radially outwardly thereby enhancing the sealing contact between the upper sealing element and the outer walls of the stem passage structure 56.

Rotation is imparted to the valve stem 50 by a valve handle or wrench 82 having a noncircular opening 84 formed therein that receives a noncircular upper portion 86 of the valve stem 50. A nut member 88 secures the operating handle 82 to the valve structure and also provides for retention of the packing retainer 72 in its operating position. For the purpose of limiting the rotative movement of the valve element precisely at the open and closed positions, a stop member 90 is received in nonrotatable relation by the noncircular portion 86 of the valve stem 50. The lock nut 80 also serves to secure the stem stop member 90 in its proper position along with the stem operating handle 82. With reference now to FIG. 3, in particular, as the valve stem 50 is rotated by the handle structure 82, the stem stop member 90 will engage a cap screw 92 or other stop element at each extremity of its rotative travel thereby positively assuring accurate positioning of the plug member at all times.

The valve structure of FIG. 1 is assembled with at least one of the end members 14 or 16 removed and with the spherical plug member 44 also removed. With the lower sealing element 66 disposed about the valve stem 50 and in engagement with the upper surface 70 of the annular flange 68 the valve stem is inserted through the stem passage 56 from the inside of the valve body 12. After the valve stem has been so inserted, the upper sealing element 64 is inserted about the valve stem element and is received within the valve stem passage. The packing retainer 72 is then threaded onto the valve stem 50 and is brought into contact with the upper surface of the upper sealing element 64. At this point, the spherical plug member may be introduced within the valve body 12 in such manner as to interfit the noncircular plug drive element 52 within the recess 54 provided therefor. The end member 14 or 16 may then be threaded into the valve body 12 until the enlarged flange thereof abuts against the valve body. The packing retainer 72 then is rotated on the valve stem sufficiently to cause deformation of the upper and lower sealing elements 64 and 66 from their originally flat washerlike configuration to the tapered configuration illustrated particularly in FIG. 5 and after deforming the sealing elements the retainer is backed off slightly to release all but minimal mechanical pressure on the sealing elements. When this has been accomplished, the stem stop member 90 and the valve actuating handle 82 are assembled to the valve stem and secured by the lock nut 88.

As internal pressure is applied to the valve, such pressure will act against the larger exterior peripheral area D1 of the lower valve sealing element 66 and against the smaller internal peripheral area D2 thereof causing exertion of greater force against the large exterior periphery than against the smaller inner periphery thereof, thereby resulting in pressure actuation of the lower sealing element inwardly toward the valve stem and enhancing the sealing ability of the lower sealing element. Simultaneously, pressure will act on the larger interior peripheral portion D3 of the upper sealing element 64 and the smaller exterior periphery thereof, causing a greater force to be exerted at the inner peripheral portion D3 thereof than at the outer peripheral portion D4. These forces also enhance the sealing ability of the upper sealing element 64 by tending to actuate the sealing element radially outwardly against the sealing surfaces thereof. Because of the mechanical interconnection between the upper sealing element 64, the retainer member 72 and the threaded portion 74 of the valve stem 50 and the upper sealing element will rotate with the valve stem and stem retainer as the valve stem induces rotation to the plug member 44 between the open and closed positions thereof.

As indicated above, after the upper and lower sealing elements 64 and 66 a have been deformed to the configuration illustrated in FIG. 5, the packing retainer 72 may be unthreaded slightly thereby releasing mechanical pressure bearing upon the sealing elements and allowing the inherent resiliency of the material from which the elements 64 and 66 are composed to maintain sealing engagement with the surfaces by which they are entrapped. The inherent resiliency of the sealing material is, of course, supplemented by fluid pressure within the valve chamber 42, which pressure actuates the lower sealing element radially inwardly and pressure actuates the upper sealing element radially outwardly as described above.

It is, therefore, apparent that I have provided a novel valve stem packing and bearing assembly that comprises dual sealing elements composed of inexpensive flat or washerlike plastic material that is deformed to a more exotic configuration upon assembly. The dual sealing elements cooperate with the mechanical structure defining the packing assembly in order to define a torturous path for fluid through the packing assembly, thereby providing more surface area for the fluid seal and yet maintaining minimum height of the packing assembly. In the event the packing assembly should begin to leak, a temporary seal may be achieved simply by removing the packing retainer member 72 and replacing the outer sealing element 64. A seal may be established through the use of only the upper sealing element and the valve can be scheduled for complete repair at a more appropriate time. Although the upper and lower sealing elements are of substantially different configuration after installation, the sealing elements are initially interchangeable since they are both formed from originally flat or washerlike sealing material. Even though the packing and bearing assembly of my invention is relatively low in height, the dynamic seals, acting through radial surfaces, provide maximum seal contact area, thereby resulting in optimum sealing ability without sacrificing the long life wear characteristics of the packing assembly. Through the unique construction of my stem packing and bearing assembly, it is quite clear that separate thrust bearing members are not required since the upper and lower sealing elements are also served as thrust bearings in addition to providing a sealing capability as provided above. From the foregoing, it is seen that this invention is one well adapted to attain all of the objects hereinabove set forth together with other advantages which become obvious and inherent from the description of the apparatus itself. As many possible embodiments may be made of the invention without departing from the spirit or scope thereof, it is to be understood that all matters herein set forth or as illustrated in the accompanying drawings are to be interpreted as illustrative and not in a limiting sense.

I claim:

1. A plug valve comprising a valve body defining a valve chamber and having inlet and outlet passages dispose in communication with a valve chamber, a rotatable valve element having a flow passage extending therethrough, said valve element being rotatable from an open position where said flow passage is disposed in fluid registry with said inlet and outlet passages to a closed position where said inlet and outlet passages are closed by said plug member, seat means disposed within said valve chamber and establishing sealing engagement with said plug member and valve body, a stem passage extending through said valve body, said valve body defining a support flange within said passage, a pair of bearing and sealing elements disposed one on either side of said support flange, an enlargement defined on said stem disposed in bearing engagement with one of said bearing and sealing members, a packing adjustment member secured to said valve stem and engaging the other of said bearing and sealing members, means mechanically interlocking said valve stem and one of said bearing and sealing element to cause rotation of said one of said bearing and sealing elements with said valve stem.

2. A plug valve as recited in claim 1, said bearing and sealing members being originally of flat configuration and being deformed upon assembly to a tapered configuration.

3. A plug valve according to claim 1, said valve stem being threaded, said bearing and sealing members being received about said valve stem, the inner periphery of at least one of said bearing and sealing members being deformed into the threads of said valve stem.

4. A plug valve according to claim 1, one of said bearing and sealing elements upon being assembled having a greater external peripheral thickness than the internal peripheral thickness thereof, the other of said bearing and sealing members having a greater internal peripheral thickness than the external peripheral thickness thereof, whereby both of said bearing and sealing elements are pressure actuated by pressure within the valve to enhance the sealing ability thereof.

5. A valve comprising a valve body having a rotatable valve element disposed therein and being rotatable between open and closed positions, a valve stem passage formed in said valve body said valve body having a support flange defining a restriction in said valve stem passage, inner and outer annular bearing and sealing elements disposed one on either side of said support flange, and partially threaded valve stem extending through said valve stem passage and having an annular flange disposed in engagement with the inner one of said bearing and sealing elements, a packing retainer member retained by said valve stem and having a surface thereof disposed in engagement with the outer one of said bearing and sealing elements, the outer one of said bearing and sealing elements being rotatable with said valve stem.

6. A valve as characterized in claim 5, the inner one of said bearing and sealing elements being of greater exterior peripheral thickness than the interior peripheral thickness thereof, the outer one of said bearing and sealing elements being of greater interior peripheral thickness than the exterior peripheral thickness thereof, whereby pressure within the valve will develop forces against both sealing elements enhancing the sealing ability thereof.

7. A valve as set forth in claim 5, the outer one of said bearing and sealing elements being mechanically interlocked with said packing adjustment member whereby said outer bearing and sealing element will rotate with said valve stem and packing adjustment member upon opening and closing movements of said valve stem.

8. A valve as recited in claim 5, said valve stem being threaded, said packing retainer member being retained by said threads, said outer bearing and sealing element being deformed upon assembly causing the inner peripheral portion thereof to be interlocked with the threads of said valve stem whereby said upper sealing element is rotated with said stem upon opening and closing of said valve.

9. A valve as set forth in claim 8, said packing retainer member having surface irregularities on the lower surface thereof, said outer sealing element being deformed upon installation thereof interlocking the upper sealing element with the surface irregularities of said retainer member.